(12) United States Patent
Park

(10) Patent No.: US 6,488,372 B1
(45) Date of Patent: Dec. 3, 2002

(54) EYEGLASSES HAVING DETACHABLE DUAL-POSITION AUXILIARY LENSES WITH VERTICAL VIEWING POSITION AND HORIZONTAL OPEN POSITION

(76) Inventor: Hun-Yang Park, 1090-6, Soosung Bosung Apt. 108-205 Soosung 4-ga Soosung-gu, Daegoo (KR)

(*) Notice: Subject to any disclaimer, the term of this patent is extended or adjusted under 35 U.S.C. 154(b) by 0 days.

(21) Appl. No.: 10/083,337

(22) Filed: Feb. 27, 2002

(30) Foreign Application Priority Data

Nov. 29, 2001 (KR) .......................................... 01-0075081

(51) Int. Cl.$^7$ ................................................. G02C 9/00
(52) U.S. Cl. ............................................ 351/47; 351/57
(58) Field of Search ............................ 351/47, 57, 48, 351/58, 41

(56) References Cited

U.S. PATENT DOCUMENTS 4,196,981 A    4/1980  Waldrop
5,737,054 A *  4/1998  Chao .......................... 351/47
6,089,708 A    7/2000  Ku

FOREIGN PATENT DOCUMENTS

WO    WO 01/13163    2/2001

* cited by examiner

Primary Examiner—Hung Xuan Dang
(74) Attorney, Agent, or Firm—Jacobson Holman PLLC

(57) ABSTRACT

A base and auxiliary eyeglass system having two bars for easy assembly and disassembly of the auxiliary eyeglasses and base eyeglasses. A first bar mounted on the base eyeglasses is equipped with magnets which interface with corresponding magnets on a second bar mounted on the auxiliary eyeglasses. The second bar has an L-shaped design permitting two necessary positions for the auxiliary glasses depending on which arm of the L-shaped second bar is aligned with the magnets on the first bar.

11 Claims, 8 Drawing Sheets

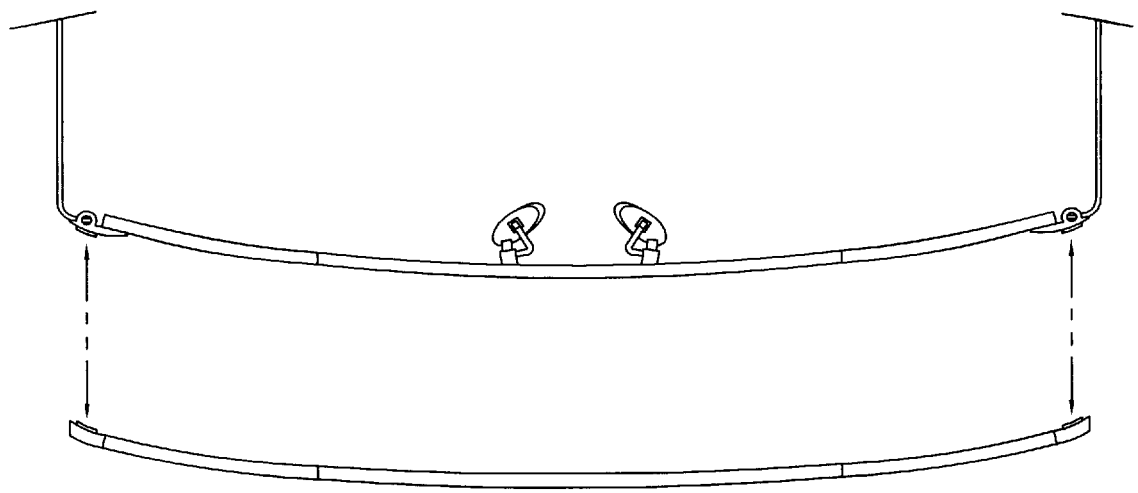
FIG.1 — PRIOR ART
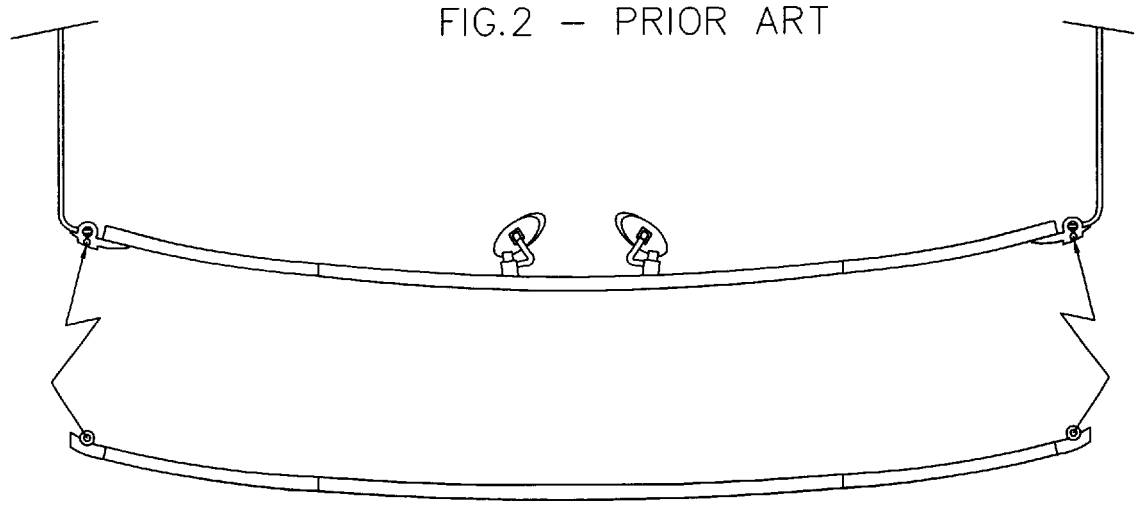
FIG.2 — PRIOR ART

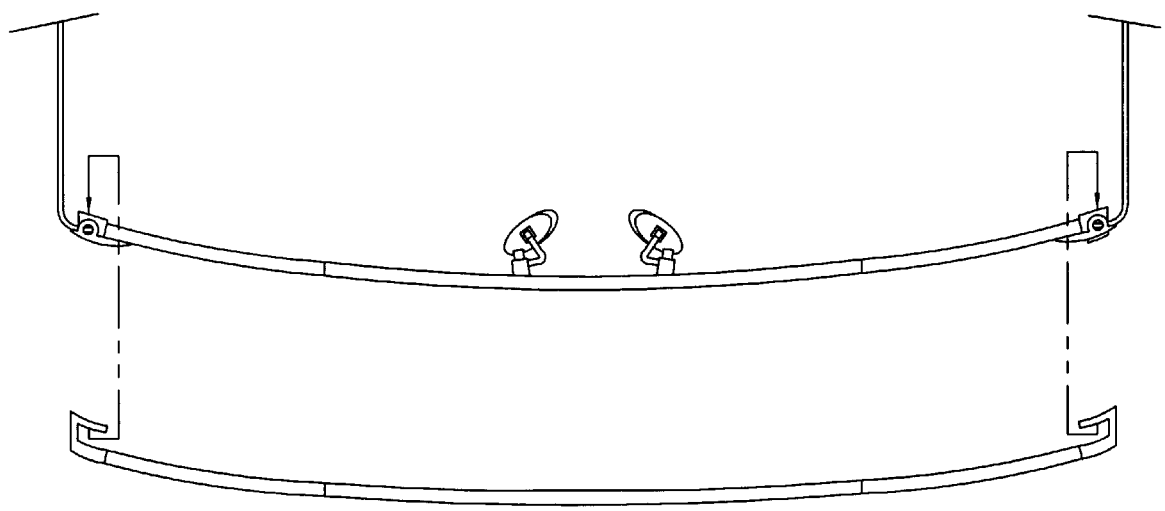
FIG.3 — PRIOR ART

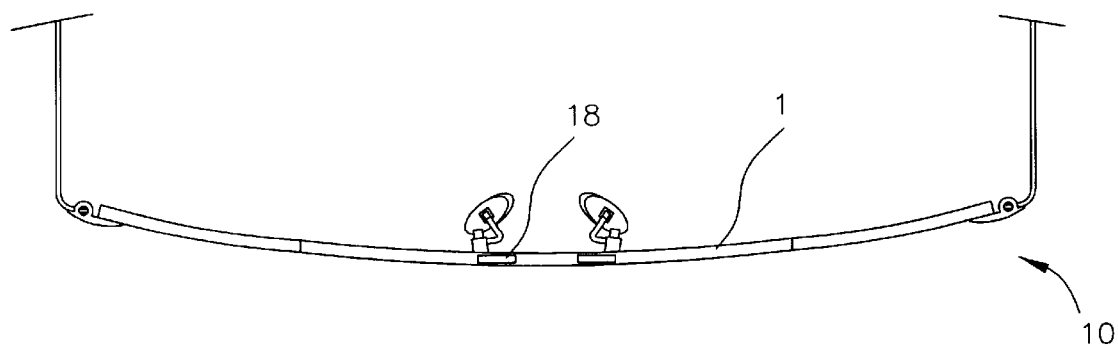
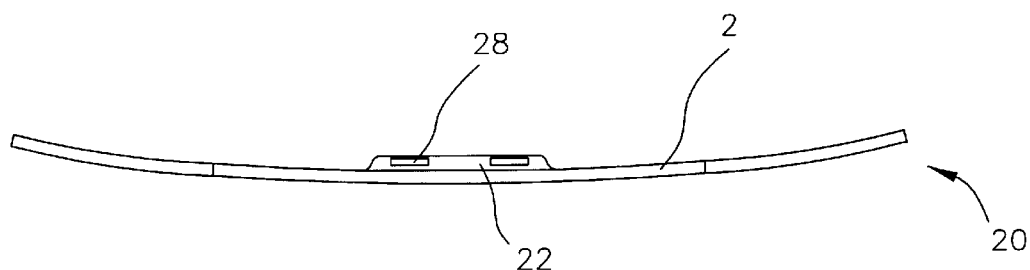
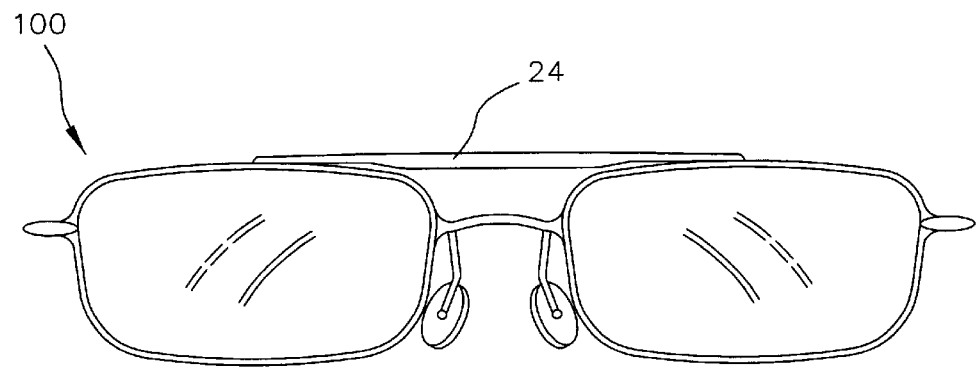

EYEGLASSES HAVING DETACHABLE DUAL-POSITION AUXILIARY LENSES WITH VERTICAL VIEWING POSITION AND HORIZONTAL OPEN POSITION

BACKGROUND OF THE INVENTION

1. Field of the Invention

The present invention is related to the field of eyeglasses and, more particularly, to an eyeglass design for easy assembly and disassembly of base glasses with auxiliary glasses using magnets.

2. Description of the Related Art

In general, there are two types of eyeglasses having auxiliary lenses that use magnets as a means of easy attachment and detachment. One type uses a set of magnets inserted on the base eyeglasses at the front sides such as where the temple arms meet the eye rims, as illustratively shown in FIGS. 1 and 2, and a second set of magnets is inserted in short, curved arm extensions located at the outer corner edges of the eye rims of the auxiliary glasses to allow the mating assembly of the base and auxiliary eyeglasses, as shown in FIG. 3.

A second type uses magnets inserted on the bridge part of the base eyeglasses in either a horizontal or vertical plane, and second magnets are inserted in the bridge part of the auxiliary glasses, allowing the mating assembly of the base and auxiliary eyeglasses. This second type allows easy assembly and disassembly of the two sets of eyeglasses at the bridge position, but both of the existing types permit the positioning of the auxiliary glasses in only one position, namely vertical so that the lenses of the base eyeglasses and the lenses of the auxiliary eyeglasses are positioned parallel with one another.

There are also eyeglasses using auxiliary glasses that do not make use of magnets but use hooks at the four corners of the auxiliary glasses to position them in front of the base eyeglasses by hooking or otherwise attaching them to the rims of the base eyeglasses. As with the magnet styles, the auxiliary glasses may be oriented in only one position, namely vertical, with the base and auxiliary eyeglass lenses positioned in parallel.

Finally, there are auxiliary glasses that do not make use of magnets but are assembled to the base eyeglasses using a hinge system that can be placed in either the bridge bar or on each of the two eye rims. This type permits the positioning of the auxiliary glasses in two positions, vertical with parallel lens positioning, and horizontal, with the auxiliary lenses oriented at 90 degrees relative to the base lenses. However, the auxiliary glasses are not detachable from the base eyeglasses but are permanently attached thereto.

Therefore, the need exists for a complete and comprehensive eyeglass system by which auxiliary glasses can be easily assembled with and disassembled from base eyeglasses, which allows for both vertical and horizontal positioning of the auxiliary glasses.

SUMMARY OF THE INVENTION

In view of the foregoing, one object of the present invention is to overcome the difficulties of combining multiple eyewear requirements, such as prescription eyewear with sunglasses or a magnifying element with eyeglasses.

Another object of the invention is a base and auxiliary eyeglass system which allows for easy assembly and disassembly.

A further object of the invention is a base and auxiliary eyeglass system supporting both a vertical auxiliary eyeglass position for natural viewing use, and a horizontal position allowing for a practical transition to non-viewing use of the auxiliary lenses.

A still further object of the invention is a base and auxiliary eyeglass system using magnetic power in conjunction with specialized system design.

In accordance with this and other objects, the present invention is directed to a base and auxiliary eyeglass system having two bars for easy assembly and disassembly of the auxiliary eyeglasses and base eyeglasses. A first bar mounted on the base eyeglasses is equipped with magnets which interface with corresponding magnets on a second bar mounted on the auxiliary eyeglasses. The second bar has an L-shaped design permitting two necessary positions for the auxiliary glasses depending on which arm of the L-shaped second bar is aligned with the magnets on the first bar.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 illustrates a top view of a first base eyeglass with auxiliary lens system according to the prior art;

FIG. 2 illustrates a top view of a second base eyeglass with auxiliary lens system according to the prior art;

FIG. 3 illustrates a top view of a third base eyeglass with auxiliary lens system according to the prior art.

FIG. 7A is a top view of the base eyeglasses of the present invention;

FIG. 7B is a top view of the auxiliary eyeglasses of the present invention;

FIG. 8 is a front view of the base and auxiliary eyeglass system of the present invention, with the auxiliary eyeglasses mounted in the vertical viewing position;

DETAILED DESCRIPTION OF THE PREFERRED EMBODIMENTS

Figure 4A:
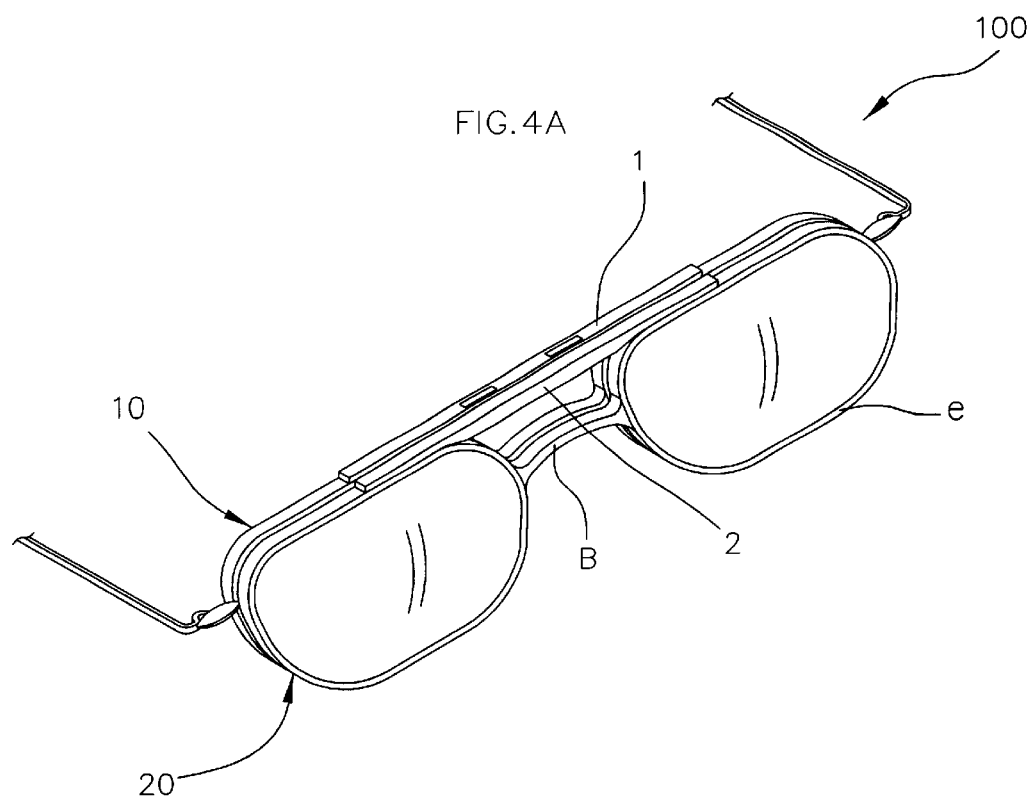
FIG. 4A is a perspective view of the base and auxiliary eyeglass system of the present invention with the auxiliary lenses in the vertical viewing position.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 4B:
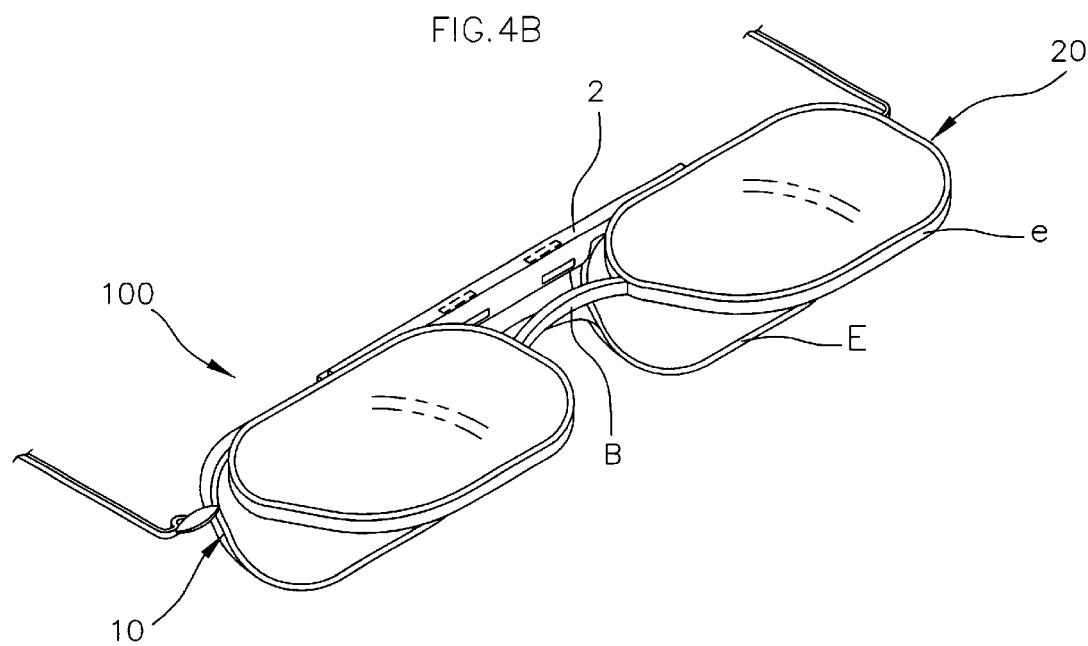
FIG. 4B is a perspective view of the base and auxiliary eyeglass system of the present invention with the auxiliary lenses in the horizontal open position.

As set forth in FIGS. 4A and 4B, the present invention relates to a combination eyewear system, generally designated by the reference numeral 100. The combination eyewear system 100 includes base eyeglasses, generally designated by the reference numeral 10, and auxiliary eyeglasses, generally designated by the reference numeral 20. The base eyeglasses include two eye rims E and a nose piece B. A first bar 1 joins the two eye rims E. The auxiliary eyeglasses also include two eye rims e, joined by a second bar 2. The auxiliary eyeglasses may be connected to the base eyeglasses in a vertical position, as shown in FIG. 4A, or in a horizontal position, as shown in FIG. 4B. The horizontal position opens to the front at an angle of approximately 90 degrees relative to the eye rims E of the base eyeglasses.

Figure 5:
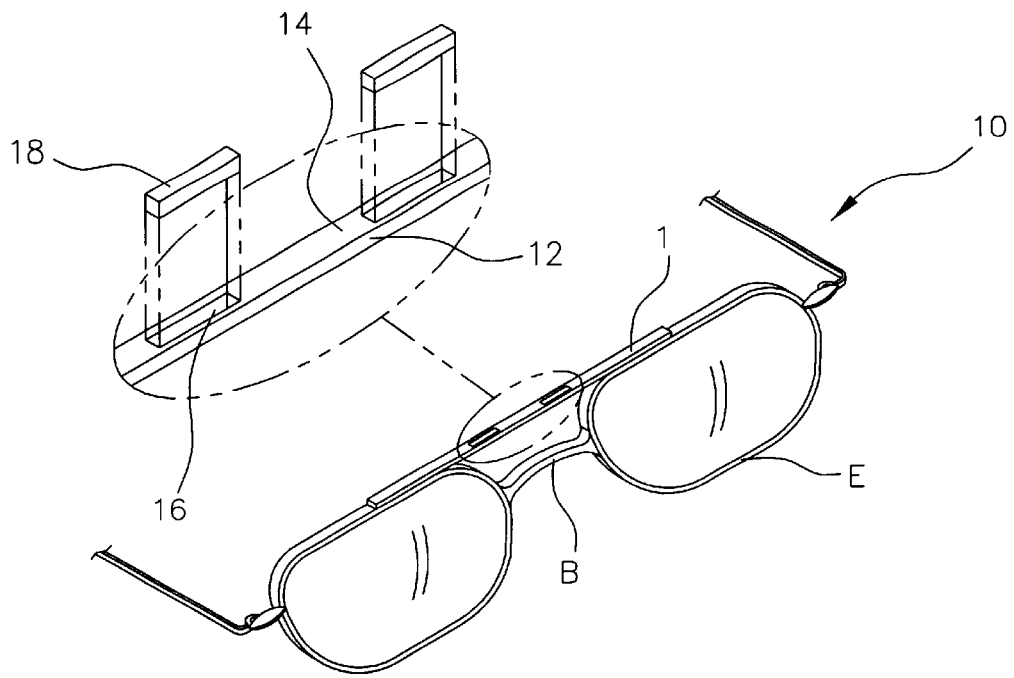
FIG. 5 is a perspective view of the base eyeglasses of the present invention with a detailed view of the bar and magnet structure.

As shown in greater detail in FIG. 5, the first bar 1 has an upper surface 14 and a lower surface 12, with openings 16 passing therebetween into which magnets 18 are inserted. The end surfaces of the magnets 18 are substantially flush with the upper and lower surfaces, respectively, creating a magnetic surface on both the upper surface 14 and the lower surface 12 of the bar. As shown, two magnets are used, although any number of magnets may be employed.

Figure 6:
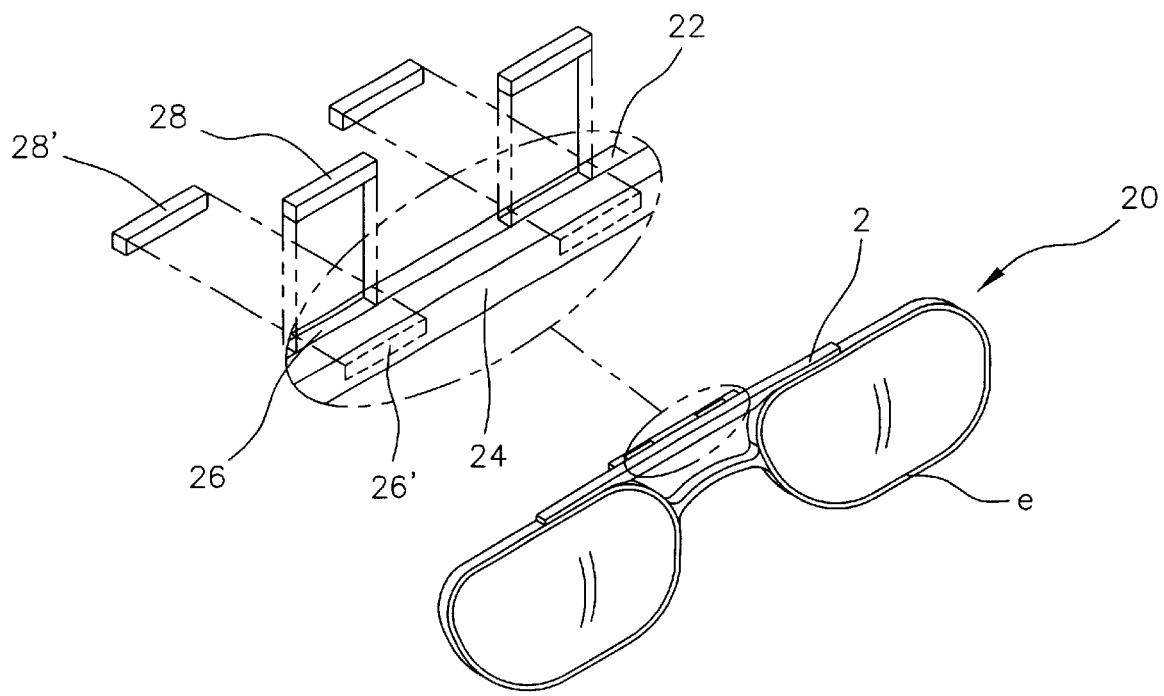
FIG. 6 is a perspective view of the auxiliary eyeglasses of the present invention with a detailed view of the L-shaped bar and magnet structure.

The second bar 2 of the auxiliary eyeglasses 20 is illustrated in FIG. 6. As shown in the magnified view of FIG. 6, the second bar 2 is L-shaped, having a first arm 22 and a second arm 24 which are substantially perpendicular to one another. Each of the first arm 22 and the second arm 24 have openings 26, 26', respectively, passing therethrough. Magnets 28, 28' are inserted in the openings 26, 26', respectively, as with the first bar 1. The eye rims e of the auxiliary glasses are substantially parallel with the second arm 24, and perpendicular with the first arm 22. As shown, there are two magnets in each arm, but other numbers of magnets may also be used.

FIG. 7A is a top view of the base eyeglasses 10, depicting the first bar 1 with magnets 18. FIG. 7B is a top view of the corresponding auxiliary eyeglasses 20, with second bar 2. From this upper view, the first arm 22, being perpendicular to the eye rims, visibly extends toward the base eyeglasses and is used to join the auxiliary eyeglasses, when in the vertical viewing position, to the base eyeglasses. A front view of the resulting base and auxiliary eyeglass assembly 100 is shown in FIG. 8. From this front view, the second arm 24, being substantially parallel to the eye rims, visibly extends upward when the auxiliary eyeglasses are mounted in the vertical viewing position, as shown.

Figure 9:
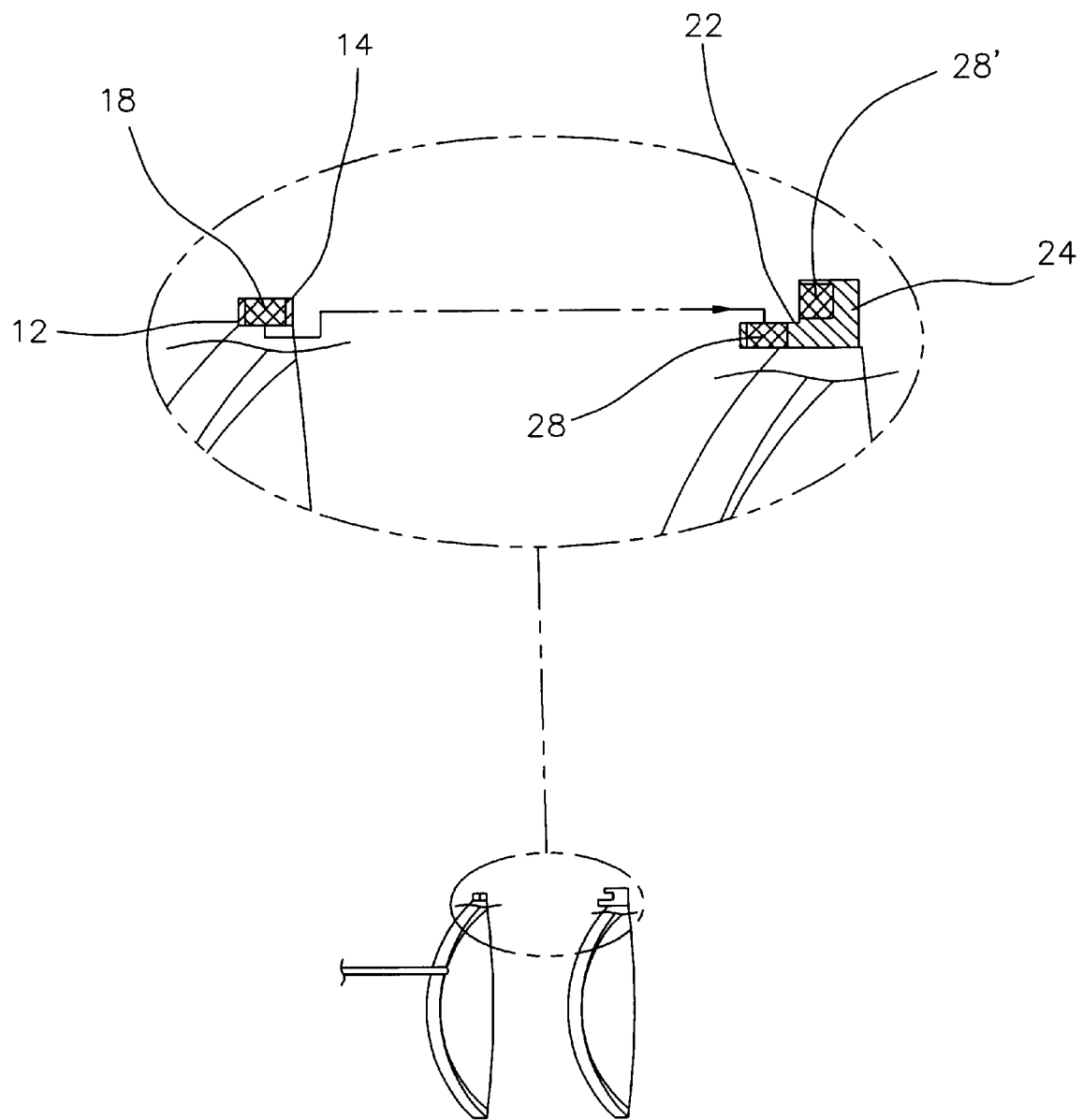
FIG. 9 illustrates a sectional view of the bar and magnet structure showing the engagement of the first and second bars in the vertical viewing position of FIG. 8.

The function of joining the auxiliary glasses to the base eyeglasses in the vertical viewing position, as obtained in FIG. 8, is illustrated in FIG. 9. When the auxiliary eyeglasses are moved into contact with the base eyeglasses, the visible upper surface of the first arm 22, as seen in FIG. 7B, engages with the lower surface 12 of the first bar 1 and is held there by the attraction between magnets 28 and magnets 18.

Figure 10:
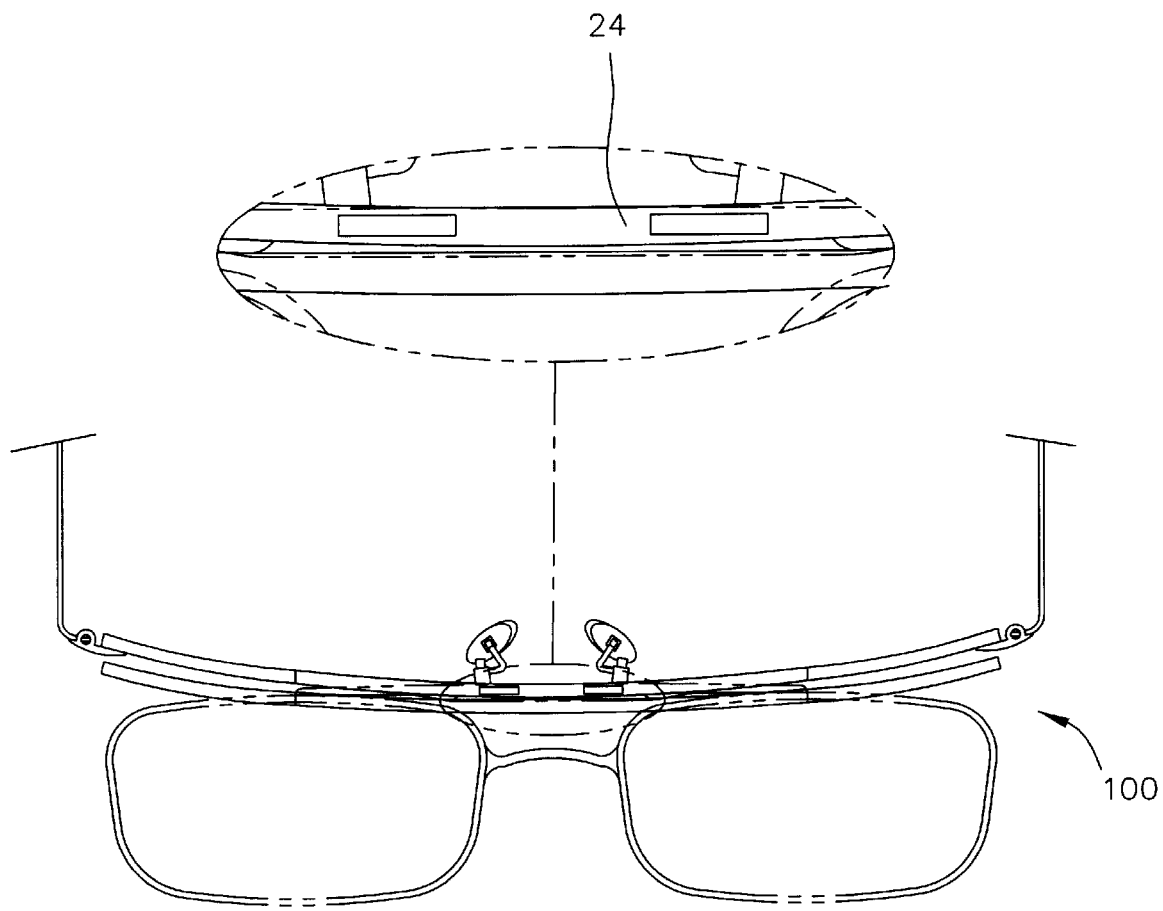
FIG. 10 is a top view of the base and auxiliary eyeglass system of the present invention as assembled, with the auxiliary eyeglasses in the horizontal open position.
Figure 11:
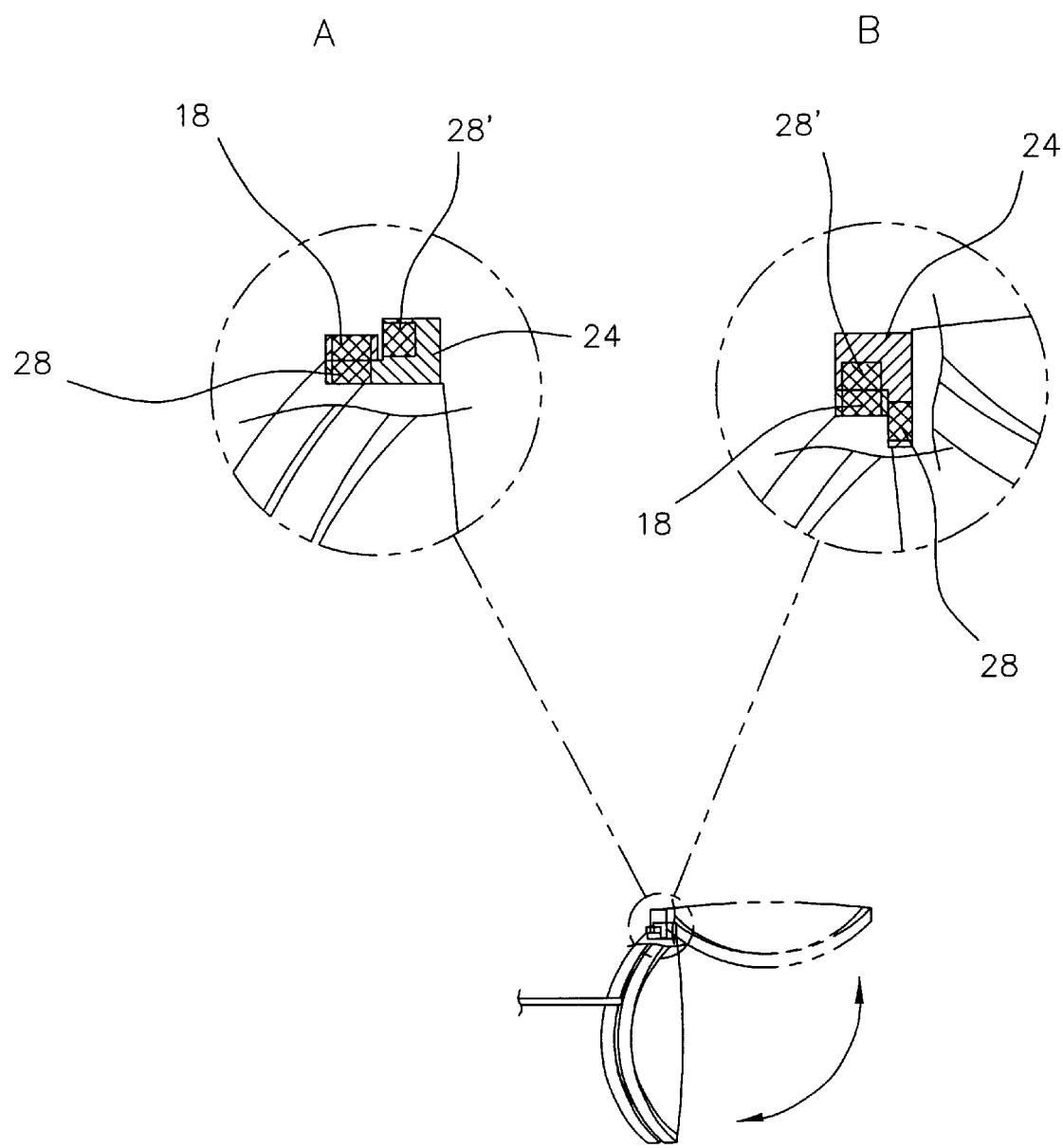
FIG. 11 is a side sectional view of the base and auxiliary eyeglass system of the present invention as assembled with detailed views illustrating the action and function of the magnets in relation to the vertical viewing position A and horizontal open position B of the auxiliary glasses.

A top view of the base and auxiliary eyeglass system 100 with the auxiliary eyeglasses in the horizontal open position is shown in FIG. 10. In the horizontal open position, the magnets 28' of the second arm 24 are used to secure the auxiliary eyeglasses to the magnets 18 of the base eyeglasses, as shown in detail B of FIG. 11. When the user wishes to change the position of the auxiliary eyeglasses, it is only necessary to push downward on the rims e, disengaging magnets 28' and rotating the L-shaped bar 2 approximately 90 degrees to bring magnets 28 into contact with magnets 18, as shown in detail A of FIG. 11. Conversely, the auxiliary lenses may be pushed upward to disengage magnets 28, rotating the L-shaped bar 2 approximately 90 degrees in the opposite direction to bring magnets 28' back into contact with magnets 18 and securing the auxiliary glasses in the horizontal open position. When in the open position, arm 24 is visible from a top view as shown in FIG. 10.

As an alternative embodiment, an iron base alloy may be used as a substitute for the magnets 18, 28, 28'. More particularly, the first bar 1 and/or the second bar 2 may be made of an iron base alloy and then magnetized to achieve the same result.

The combination eyewear of the present invention may be used to combine prescription eyeglasses with sunglasses, or to add magnifying elements to eyeglasses, etc., and is intended for all needs in which supplementary magnification of vision is required. The intended uses cover all aspects of eyewear as well as industrial security glasses frequently used in industrial sites, therefore offering maximum practicality and ease of use. The present invention, by its design and assembly which allow the auxiliary glasses to be used in both vertical and horizontal positions, makes it easy to switch the use of the two vision aids without completely detaching the base eyeglasses from the auxiliary glasses. This is very helpful in situations such as when driving through a series of open roads and tunnels during which vision light-control requirements change quickly, or when different levels of vision magnification are alternately required.

The foregoing descriptions and drawings should be considered as illustrative only of the principles of the invention. The invention may be configured in a variety of shapes and sizes and is not limited by the dimensions of the preferred embodiment. Particularly, the present invention is intended to encompass the same concept of an L-shaped bar and a flat-straight bar in conjunction with any form of magnetization to achieve the same results as described herein. Numerous applications of the present invention will readily occur to those skilled in the art. For example, the present invention may be used to fulfill needs associated with every aspect of industrial security and/or sunglass eyewear, including prescription and magnification applications, including facial protection that uses eyewear as a base support. Therefore, it is not desired to limit the invention to the specific examples disclosed or the exact construction and operation shown and described. Rather, all suitable modifications and equivalents may be resorted to, falling within the scope of the invention.

What is claimed is:

1. A base and auxiliary eyeglass system comprising:
    base eyeglasses having a first set of eye rims joined by a first bar;
    auxiliary eyeglasses having a second set of eye rims joined by a second bar, said second bar having an L-shaped cross-section enabling said auxiliary eyeglasses to be attached to said base eyeglasses in a vertical viewing position and, alternatively, in a horizontal open position, said second bar including a first arm and a second arm oriented adjacent and substantially perpendicular to one another, said first arm having a first magnet engaging an underside of said first bar when said auxiliary eyeglasses are attached to said base eyeglasses in said vertical viewing position, and said second arm having a second magnet engaging a top surface of said first bar when said auxiliary eyeglasses are attached in said horizontal open position.

2. The base and auxiliary eyeglass system of claim 1, wherein said first bar includes a magnet.

3. The base and auxiliary eyeglass system of claim 2, wherein said first and second magnets are engaged independently of one another such that only said first magnet or only said second magnet is in contact with said magnet on said first bar at any given time.

4. The base and auxiliary eyeglass system of claim 3, wherein said first magnet includes two magnets spaced from one another and in alignment with two magnets positioned on said first bar.

5. The base and auxiliary eyeglass system of claim 4, wherein said second magnet includes two magnets spaced from one another and in alignment with said two magnets positioned on said first bar.

6. The base and auxiliary eyeglass system of claim 3, wherein said second magnet includes two magnets spaced from one another and in alignment with two magnets positioned on said first bar.

7. The base and auxiliary eyeglass system of claim 1, wherein said first arm of said second bar includes a first plurality of magnets, and said second arm of said second bar includes a second plurality of magnets, said first plurality of magnets securing said auxiliary eyeglasses to said base eyeglasses in said vertical viewing position, and said second plurality of magnets securing said auxiliary eyeglasses to said base eyeglasses in said horizontal open position.

8. A base and auxiliary eyeglass system comprising:

base eyeglasses having a first set of eye rims joined by a first bar, said first bar having a first plurality of magnets mounted therein such that a magnetic field is created on both an upper and lower surface of said first bar;

auxiliary eyeglasses having a second set of eye rims joined by a second bar, said second bar having an L-shaped cross-section with first and second arms, said first arm enabling said auxiliary eyeglasses to be attached to said lower surface of said first bar of said base eyeglasses in a vertical viewing position in which said first and second sets of eye rims are substantially parallel with one another and, alternatively, said second arm enabling said auxiliary eyeglasses to be attached to said upper surface of said first bar in a horizontal open position in which said first and second sets of eye rims are substantially perpendicular to one another, each of said first and second arms having a respective plurality of magnets mounted therein for engaging with said first plurality of magnets mounted in said first bar, only one of said first and second arms magnetically engaging with said first bar at any given time.

9. The base and auxiliary eyeglass system of claim 8, wherein said second bar has an inner horizontal surface on said first arm and an inner vertical surface on said second arm, said inner horizontal and inner vertical surfaces oriented adjacent and approximately perpendicular to one another, said inner horizontal surface magnetically engaging the lower surface of said first bar when said auxiliary eyeglasses are attached to said base eyeglasses in said vertical viewing position, and said inner vertical surface magnetically engaging the upper surface of said first bar when said auxiliary eyeglasses are attached in said horizontal open position.

10. The base and auxiliary eyeglass system of claim 8, wherein said first plurality of magnets includes two magnets spaced from one another and in alignment with two magnets positioned on said first arm.

11. The base and auxiliary eyeglass system of claim 8, wherein said first plurality of magnets includes two magnets spaced from one another and in alignment with two magnets positioned on said second arm.

* * * * *